United States Patent [19]

Snyder et al.

[11] Patent Number: 5,140,894
[45] Date of Patent: Aug. 25, 1992

[54] GAS SPRING ACTUATOR

[75] Inventors: David E. Snyder, Longview; M. Wayne Perkins, White Oak; Joe D. Maxwell, Longview, all of Tex.

[73] Assignee: Axelson, Inc., Longview, Tex.

[21] Appl. No.: 616,394

[22] Filed: Jan. 16, 1991

[51] Int. Cl.⁵ .................... F15B 21/04; F01B 31/00
[52] U.S. Cl. .................... 91/4 R; 91/417 R; 92/134
[58] Field of Search .......... 91/4 R, 165, 417 R, 91/DIG. 4; 92/134, 130 R, 5 R, 8, 13.8

[56] References Cited

U.S. PATENT DOCUMENTS

| | | | |
|---|---|---|---|
| 3,244,399 | 4/1966 | Jones et al. | 251/327 |
| 3,746,329 | 7/1973 | Galle | 267/125 |
| 3,871,527 | 3/1975 | Schimmeyer et al. | 92/8 |
| 3,952,632 | 4/1976 | Ericksson et al. | 92/134 |
| 4,129,283 | 12/1978 | Taylor | 251/62 |
| 4,135,547 | 1/1979 | Akkerman et al. | 137/315 |
| 4,216,703 | 8/1980 | Schoeneweis | 72/63 |
| 4,519,577 | 5/1985 | Jones | 251/62 |
| 4,563,941 | 1/1986 | Soendergaard | 92/134 |
| 4,751,867 | 6/1988 | Johansson et al. | 92/5 R |
| 4,759,260 | 7/1988 | Lew | 91/394 |
| 4,777,800 | 10/1988 | Hay, II | 60/593 |
| 4,961,316 | 10/1990 | Corke et al. | 92/134 |

FOREIGN PATENT DOCUMENTS 0918591 4/1982 U.S.S.R. .................... 92/134

Primary Examiner—Edward K. Look
Assistant Examiner—Hoang Nguyen
Attorney, Agent, or Firm—Jones, Day, Reavis & Pogue

[57] ABSTRACT

A gas spring actuator which, when attached to a valve, will return the valve to its initial position after the valve has been moved to a second position by application of a pressurized fluid that opposes the gas spring. The gas spring is charged to a predetermined gas pressure. A hydraulic fluid is applied in an opposing manner to drive the piston in one direction to operate the valve and simultaneously pressurize the gas in the gas spring. Upon removal of the hydraulic pressure, the pressurized gas returns the piston, and the valve, to its initial position.

21 Claims, 2 Drawing Sheets

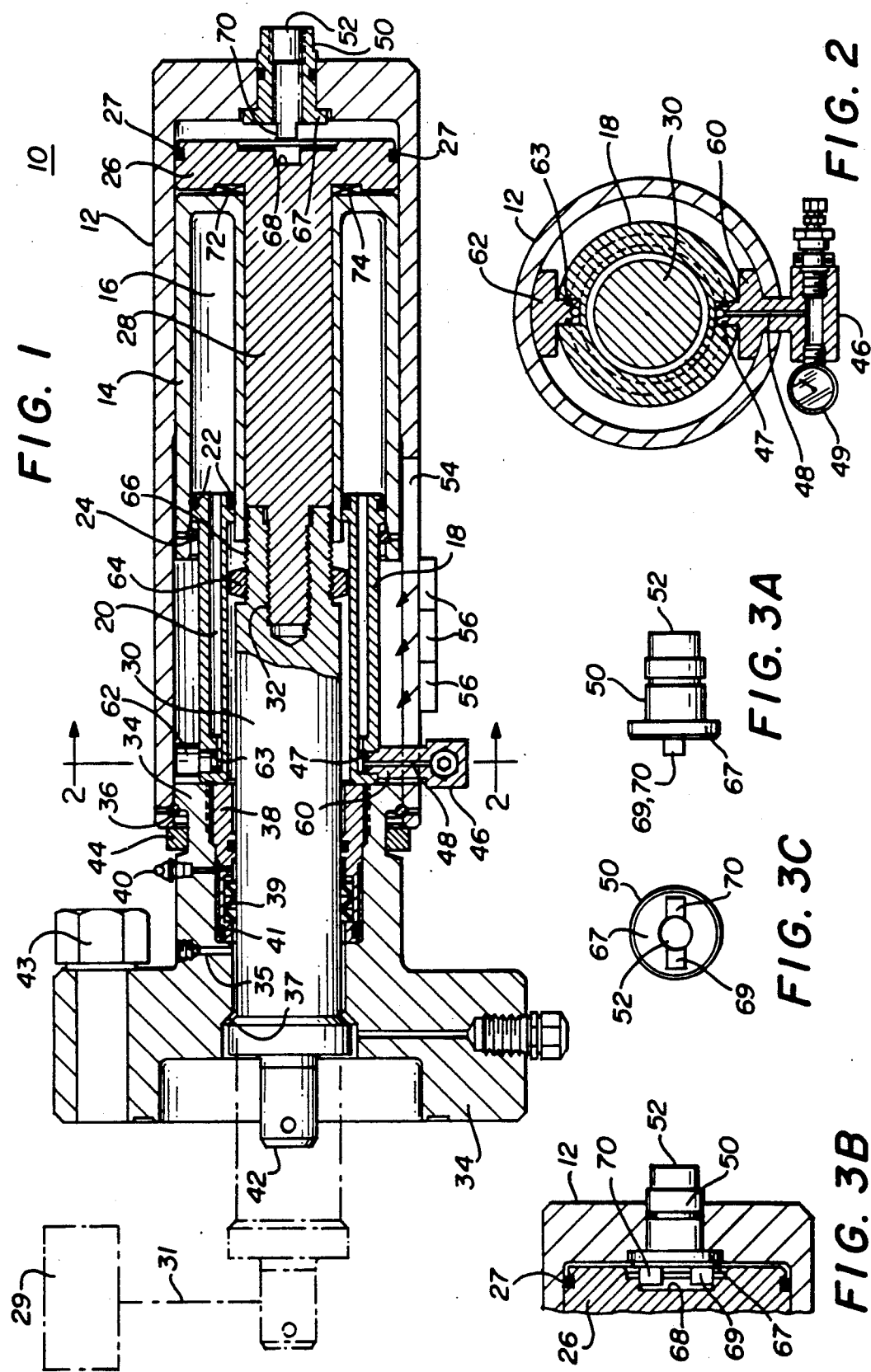

GAS SPRING ACTUATOR

FIELD OF THE INVENTION

The present invention relates in general to actuators and in particular to a valve actuator having a gas spring in which gas is compressed when the piston moves from its initial position to a second position under a hydraulic force and which returns the piston to its initial position when the hydraulic force is removed.

BACKGROUND OF THE INVENTION

It is well known in the petroleum industry that gate valves are required for use in the piping at various locations and in particular in piping known in the industry as a christmas tree located at a drilling location. The gate valve opens and closes to contain pressure within the well bore. It is also well known in the industry that wireline is used to lower tools of various types into the well bore in an oil or gas well through the bore of the safety valve in the upper master valve of the christmas tree. It is necessary therefore to attach an actuator to the safety valve, which may be of the gate valve type, that will provide the forces necessary to move the valve between the open and closed positions by application or removal of a pressurized fluid. In a typical application the valve would incorporate a reverse-acting gate in a conventional manner which would be moved to the open position by application of a pressurized fluid through the inlet port to the top of the actuator piston. Upon removal of the pressure applied to the inlet port, the safety valve would move to the closed position due to the force developed by valve body pressure acting on the area of the valve stem. The actuator design in the prior art incorporates a linear force storage device which assists in closing and is capable of closing the valve when valve body pressure is not present. This type of operation is conventional in safety valves. On occasion, however, wireline may be extending through the safety valve because of tools of various types that have been lowered into the well bore. It may be necessary to close the valve with sufficient force to cut the wireline. The additional factor in wireline cutting actuators is that the closing force must be sufficient not only to close the valve when valve body pressure is absent, but also to provide the additional force to cause the valve gate to shear through any wireline that is in the valve bore at the time of closing.

Wireline cutting actuators to perform this function are common in the industry. In most cases, the design force at the wire cutting position is over eight thousand pounds. Traditionally, this force has been developed by large coil springs, cams, helical springs, spring washers or other type devices.

The prior art devices have a number of disadvantages. First, they must be very large to accommodate the size of springs that are necessary to develop the force that must be present to cut wirelines. Thus, they are very heavy and very large. In addition, the force generated by the metal springs is in proportion to the size and weight. Thus, there is a limit to the force that can be generated inasmuch as the size of the actuator is a factor to be considered in the use of the devices at the wellhead. Further, in order to have a predetermined force necessary to close the valves without any well pressure, there must be a predetermined compression built into the springs which creates a hazard condition when disassembling and handling the valves. Also, it is difficult to provide a variable and adjustable closing force with the use of metal springs. Further, there is no way to indicate the force units available in such a device. One simply has to know from the construction and the age of the device how much force it can provide.

The present invention overcomes the disadvantages of the prior art by providing an actuator which utilizes a gas spring. Thus, a variable and adjustable closing force can be provided. In addition, a pressure gauge can be utilized to indicate the force units available. This gas spring valve actuator can generate a higher force for the same size unit than metal springs can provide. It is of small size and weight and is so constructed as to provide safety in disassembly and handling thereof.

The force generating element is a gas compression device commonly known as a gas spring. Gas springs have been used in large metal presses to separate the die heads. As far as is known, gas springs have not been used in valve actuators prior to the present invention. The novel concept uses a concentric, annular gas spring design that fits around the valve stem to create a uniform force in a minimum size envelope. The gas spring can develop the high forces required in a smaller package than that which must be used with standard springs.

The gas spring includes concentric, annular cylinders with a first stationary body member that has pressure seals which engage with the internal bore of a second movable annular spring body member. An integral gas charging device allows the injection and pressurization of gas trapped in the concentric annular cylinders. Pressure in the annular cylinders forces the first body member and piston in a direction to exert force on top of the valve bonnet and the gas spring housing to exert force on the actuator piston and gate valve stem urging the stem to move the sealing element of the gate valve to the closed position. The integral gas charging device connects to the interior of the second body member of the gas spring by a sealed connection. The side force generated by the gas charge pressure acting on this connection is balanced by a connection of equal size on the opposite side of the second body member. This design counteracts all side forces developed at the pressure ports.

The force of the gas spring depends upon pressure trapped in the spring cylinder created by the first and second spring body members. By having an integral charging device, the pressure can be changed, thus changing the closing force without changing any parts or disassembling the actuator. Thus, a variable and adjustable closing spring force can be provided.

Further, the integral charging device for the gas spring may include a pressure gauge that will constantly indicate the pressure trapped inside the gas spring cylinder. Since the areas exposed to pressure are constant, the pressure is in a direct relationship with force and the gauge may be calibrated in force units available. In this way, the actuator can be checked regularly for available closing force without disassembly.

In addition, the gas spring can produce forces in excess of that available with other types of conventional metal springs in the same overall size outer housing. The smaller size and weight are important in applications on wellheads on offshore oil and gas production platforms. This becomes an advantage in installation in maintenance, especially on high density production platforms.

The actuator is designed to prevent disassembly of the actuator without first removing all fluid pressure from the actuator. The gas spring in the subject invention contributes to safety over conventional spring designs. The gas spring must be depressurized prior to removal from the actuator housing. The integral charging device must be removed before the gas spring body members can be removed from the housing. To do this requires that the gas spring be partially compressed for removal of the integral charging device. Compression of the gas spring cannot be readily accomplished without removal of the gas charge, thus removing the spring force. Once the gas charge is removed, there are no retained forces. Also, since the gas spring is charged after installation, there is no requirement for the compression of springs and the use of special tools during assembly as with conventional mechanical springs.

Further, the gas spring lends itself inherently to a variety of operating procedures. The actuator may be used as a spring return actuator to the outward or closed position. By simply connecting the gas spring integral pressurizing device to a second fluid pressure source, the actuator becomes a "double acting" actuator that may be powered in either direction by application of fluid pressure to the appropriate chamber while venting fluid pressure from the opposite chamber. A third way in which the actuator may be used is as a spring return to the inward or open position by simply charging the actuator chamber above the piston with the gas charge and admitting the pressurized actuating fluid to the gas spring integral charging device. This simply reverses the operation of the actuator.

Due to the attachment of the outer actuator housing to the valve bonnet by the use of a retaining ring, the outer housing may be rotated to any convenient position to align a window therein for the gas spring position indication. The fluid connection to the actuator is made through the top center of the outer actuator housing which allows the actuator supply pressure inlet to remain fixed.

The unit is also safe and easy to disassemble. On removal of pressure from the actuator by disconnection of the actuator pressure inlet piping from a fluid connection port on the top of the actuator housing, a square positioning ring at the bottom of the actuator housing may be snapped out of its position. The fluid connection port is designed so that it is necessary that it be pushed inwardly and rotated to engage a slot in the piston head to commence disassembly of the valve. The fluid connection port cannot be pushed inwardly while pressure is maintained in the actuator, thus making disassembly under pressure virtually impossible. The actuator housing can then be pushed downwardly. A retainer ring may then be removed from a groove in the actuator housing. Rotation of the piston by turning the inlet connection on top of the housing (which is now locked to the piston) will unthread the piston from its stem, thus allowing the actuator to move outwardly from the bonnet. Bearings are located between the piston and the top of the gas spring to provide easier rotation of the stem without rotating the gas spring. The gas spring may retain the gas charge and remain pressurized because it can only extend to the limit of a retainer ring between the first gas spring body member and the second gas spring body member. Once this point of spring extension is reached, all force from the gas spring is internally retained and the piston may be fully unthreaded from the valve stem allowing removal of the actuator assembly from the bonnet of the valve. The actuator assembly may be reinstalled on the bonnet in the reverse procedure without changing the gas spring setting or the charge.

In addition, a slot is provided in the side of the actuator housing to reveal the position of the first gas spring body member which is relative to the position of the valve. Position indicating switches, such as microswitches, may be adapted to this area for remote position indication. The downstop position of the actuator is dependent upon the relative location of a downstop nut on the valve stem. This may easily be adjusted for the proper valve stroke prior to or after the assembly of the actuator to the bonnet.

Thus, it is an object of the present invention to provide a gas spring actuator.

It is also an object of the present invention to provide a gas spring actuator which has a variable and adjustable closing force.

It is still another object of the present invention to provide an indication of actual closing force with the use of a pressure gauge that will constantly indicate the pressure trapped inside the gas spring.

It is still another object of the present invention to provide a gas spring which can produce forces in excess of that available with other types of conventional metal springs in the same overall size housing.

It is also an object of the present invention to provide a gas spring which has smaller size and weight than comparable size valve actuators utilizing metal springs.

It is yet another object of the present invention to provide a gas spring actuator that is safe to disassemble and handle because it cannot be disassembled without first removing fluid pressure from the gas spring.

It is also an object of the present invention to provide a gas spring actuator that can be used as a spring return actuator to either close or open a valve.

It is yet another object of the present invention to provide a gas spring actuator that can be used as a "double acting" actuator that may be powered in either direction.

It is still another object of the present invention to provide a gas spring actuator that has a visual position indicating window through which the position of the gas spring can be noted and which can be moved to any convenient position by rotating the housing to align the window for position indication.

It is yet another object of the present invention to provide visual position indication and position indicating switches that may be used to indicate the gas spring position at a remote location.

It is also an object of the present invention to provide a downstop position adjustment to adjust the proper valve stroke.

SUMMARY OF THE INVENTION

Thus, the present invention relates to a valve actuator for moving a valve between open and closed states comprising an actuator housing, a hydraulic piston in the housing coupled to the valve and movable between first and second positions to open and close the valve, a compressible fluid on one side of the piston, and hydraulic pressure selectively applied to the other side of the piston for compressing the compressible fluid while moving the piston from the first position to a second position to change the valve state such that when the hydraulic pressure is removed, the compressed fluid returns the piston to the first position to restore the valve state.

The invention also relates to a method of opening and closing a valve comprising the steps of coupling an arm to a piston in an enclosed housing, coupling the piston arm to a valve to change the valve position when the arm is moved in one direction and to return the valve to its initial position when the arm is moved in the other direction, forcing the piston in one of the directions with hydraulic fluid pressure to change the valve position, and compressing a fluid in a closed chamber under the piston when the piston is forced in one of the directions such that when the hydraulic fluid pressure is released, the compressed fluid under the piston provides the required pressure to return the valve to its initial position.

BRIEF DESCRIPTION OF THE DRAWINGS

These and other objects of the present invention will be more fully understood in conjunction with the accompanying drawings in which like numbers indicate like components and in which:

FIG. 1 is a cross-sectional view of the novel gas spring valve actuator;

FIG. 2 is a cross-sectional view of the valve actuator in FIG. 1 taken along lines 2—42;

FIG. 3A is a side view of the hydraulic fluid connection fitting that can be used to uncouple the piston from the piston stem;

FIG. 3B is a partial side view indicating the hydraulic fluid connection being coupled to the piston for removal thereof;

FIG. 3C is a top view of the piston indicating the slot for receiving the hydraulic fluid connection for removal of the piston during disassembly of the actuation.

DETAILED DESCRIPTION

Figure 4:
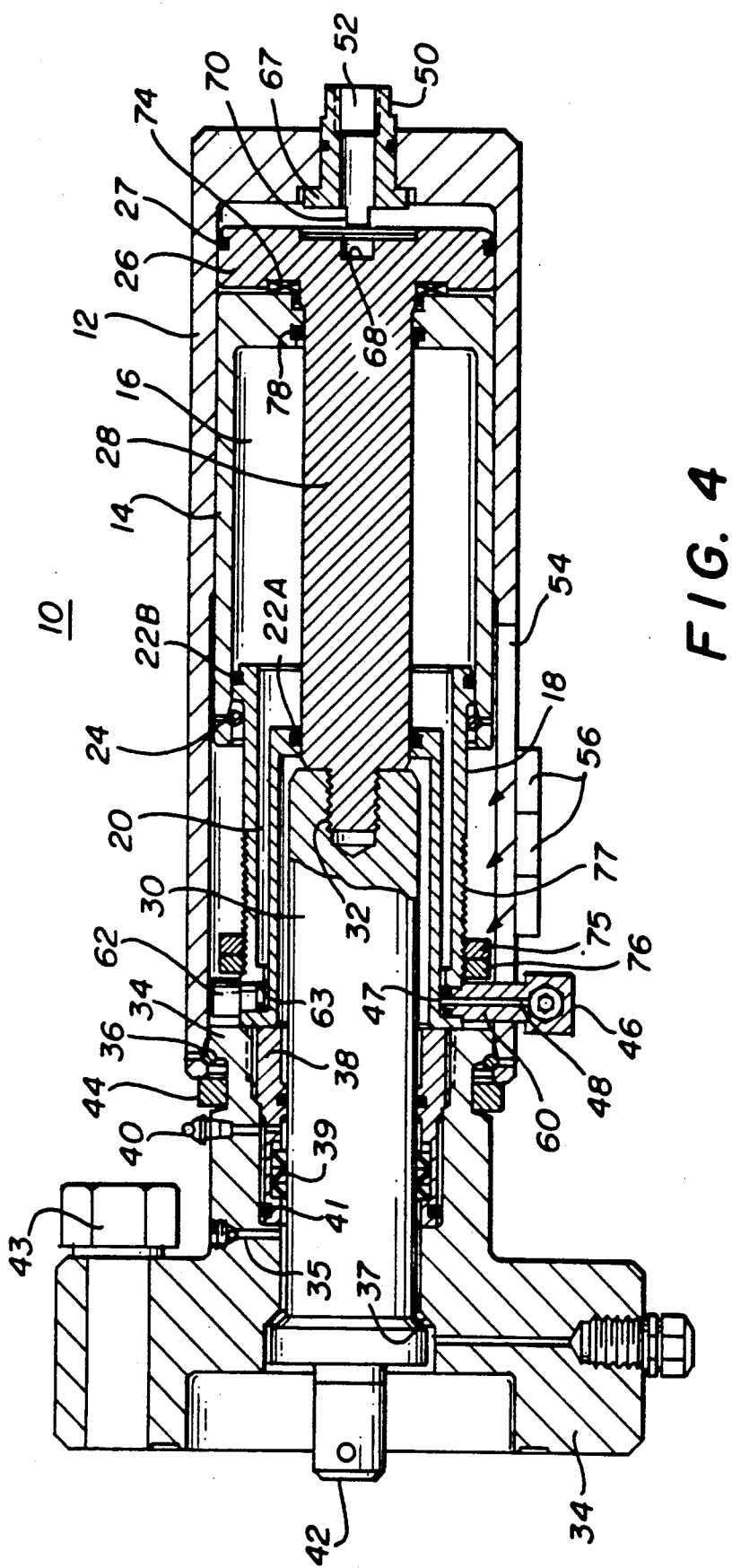
FIG. 4 is a partial view of an alternate embodiment of the novel gas spring actuator.

The novel gas spring actuator 10 is illustrated in cross-sectional detail in FIG. 1. While the actuator in FIG. 1 will be described herein with relation to a gate valve for use in a well bore, it is to be understood that the gas spring actuator may be used in other applications and is not limited to the actuation of a gate valve for a well bore. The gas spring actuator 10 includes an actuator housing 12 and a first moveable gas spring body member 14. The first gas spring body member 14 has an annular hollow chamber 16. A second gas spring body member 18 has a second annular hollow chamber 20 and is slidably mounted in the hollow chamber 16 of first gas spring body member 14. Seals 22 prevent any pressurized fluid in annular hollow chambers 16 and 20 from escaping. A retaining ring 24 enables sliding movement of the first gas spring body member 14 with respect to the second gas spring body member 18, but limits the amount of travel of the first body member 14 with respect to the second body member 18. A piston head 26 is mounted in said housing 12 and has a piston rod or arm 28 integrally formed therewith and extending through the center of the first and second gas spring body members 14 and 18. Seals 27 prevent any fluid pressure above the piston head 26 from bypassing the piston head 26 into the area of housing 12 below the piston head 26. An elongated piston extension 30 is threaddedly connected to piston shaft or arm 28 by means of threads 32. Bonnet 34 surrounds the elongated piston extension 30 and the stem or end 42 of the piston extension 30. The stem 42 may be coupled in any well-known manner 31 to a gate valve 29 for actuation thereof. In actual operation, the gate valve 29 is bolted to the bonnet 34 with bolts 43 and the full well pressure in the gate valve 29 is present around stem 42. An actuator housing retaining ring 36 couples the housing 12 to the bonnet 34. Packing retainer 38 has seals 39 and 41 therein to prevent any well pressure from entering into the area around elongated piston extension 30. In addition, a metal-to-metal seal at 37 between a portion of the stem 42 and the bonnet 34 is designed to prevent well pressure in the gate valve 29 from entering the area around the elongated piston extension 30. A back seat check valve fitting 35 may be utilized if desired to check the metal-to-metal seals 37. Appropriate grease fittings 40 may be utilized to lubricate the engagement of the packing retainer with the piston extension 30.

An actuator position ring 44 is located at the bottom of the actuator housing 12 and may be snapped out of its position to allow the housing 12 to be moved to the left in FIG. 1, thus disengaging the retaining ring 36 and allowing the unit to be disassembled as will be explained hereafter. An integral charging device 46 is coupled through a window 54 in the actuator housing 12 and engages the second gas spring body portion 18. The charging device 46 has an annular bore 48 which couples with the chamber 20 of second gas spring body member 18 to allow the charging of the gas spring by forcing gas into hollow annular chambers 16 and 20. It will be noted in FIG. 2 that charging device 46 has a wing-like body portion 60 for mounting the second gas spring body portion 18 in the center of the housing 12. A second wing-like mounting member 62 is utilized on the opposite side of the second gas spring body portion 18 to center the second body portion 18 in the housing 12. It will also be noted that annular hollow chamber 20 has a fluid connection to the bottom of mounting member 62 to provide an equal and opposite pressure to that applied to the other side of second gas spring body portion 18 by the integral charging device 46. Thus, the forces are balanced and there are no side forces applied to second gas spring body portion 18. Seals 47 and 63 prevent the pressure applied through the integral charging device 46 from escaping around the mounting members 60 and 62. A pressure gauge 49 may be attached to the integral charging device 46 as illustrated in FIG. 2 to provide a visual indication of the pressure in the hollow annular chambers 16 and 20. Since the areas exposed to pressure inside the hollow annular chambers 16 and 20 are constant, the pressure has a direct relationship with force and the gauge 49 may be calibrated in force units available. In this way, the actuator can be checked regularly for available closing force without disassembly.

Finally, a downstop position of the actuator 10 is dependent upon the relative location of a downstop nut 64 on the valve stem 30. Since it is mounted on the stem 30 with threads 66, it can easily be rotated to be adjusted for the proper valve stroke prior to the assembly of the actuator to the bonnet.

The novel gas spring actuator 10 lends itself inherently to a variety of operating procedures. The actuator 10 may be used as a spring return actuator to the closed valve position as described earlier. Simply by connecting the gas spring integral pressurizing device 46 to a second fluid pressure source, and a first fluid pressure source coupled to connector 50, the actuator 10 becomes a "double acting" actuator that may be powered in either direction by application of fluid pressure to the appropriate chamber either above the piston 26 or below the piston in annular chambers 16 and 20 while venting fluid pressure from the other chamber. A third way in which the actuator 10 may be used is as a spring return to the open position by simply charging the upper actuator chamber on the top of piston 26 with the gas charge and admitting the pressurized actuating fluid to the gas spring integral charging device 46. This simply reverses the operation of the actuator 10.

Because the actuator housing 12 is attached to the valve bonnet 34 by the use of retaining ring 36, the housing 12 may be rotated to any desired position to align the window 54 in the direction of the viewer for noting the indication of the position of the first gas spring body member 14. The fluid connection fitting 50 to the actuator 10 is made through the top center of the actuator housing 12 which allows actuator supply pressure inlet 50 to remain fixed even though the housing 12 is rotated.

The actuator 10 is designed so that it cannot be disassembled without first removing all the fluid pressure from the actuator. The gas pressure in chambers 16 and 20 must be released and the chambers depressurized prior to removal from the actuator housing 12. The integral charging device 46 must be removed before the gas spring second body portion 18 can be removed from the housing 12. To do this requires that the gas spring be partially compressed for removal of the integral charging device 46. Compression of the gas spring cannot be readily accomplished without removal of the gas charge, thus removing the spring force. Once the gas charge is removed, there are no retained forces. Also, since the gas spring is charged after installation, there is no requirement for the compression of springs and the use of special tools during assembly as with the prior art mechanical springs.

To disassemble the actuator 10, pressure is removed from the actuator 10 by disconnecting the actuator pressure from the inlet fitting 50 on the top of the actuator 10. The square positioning ring 44 at the bottom of the actuator housing 12 is snapped out of its position. The fluid connection port housing for fitting 50 on the top of the actuator housing 12 is so designed that it is necessary that it be pushed inwardly to engage a slot in the piston before disassembly of the valve can begin. The fluid connection port housing or fitting 50 cannot be pushed inwardly while pressure is maintained in the actuator 10, thus making disassembly under pressure virtually impossible. With the pressure removed, however, the actuator housing 12 can be pushed downwardly. The retainer ring 36 can then be removed from the groove in which it is positioned in the actuator housing 12 and the bonnet 34. Rotation of the piston 26 can take place by turning the inlet connection 50 on top of the housing 12 (which is now locked to the piston 26 by projections 69 and 70 as shown in FIGS. 3A, 3B, 3C engaging the slot 76 in the top of piston 26) will unthread the piston rod 28 from the stem 30 allowing the actuator housing 12 to move outward from the bonnet 34. Bearings 72 and 74 are located between the bottom of the piston 26 and the top of the first gas spring body member 14 to provide easier rotation of the piston 26 without rotating the first gas spring body member 14. The hollow annular chambers 16 and 20 may retain the gas charge and remain pressurized because the first gas spring body member 14 can extend only to the limit of the retaining ring 24 between the first and second gas spring body members 14 and 18. Once this point of spring extension is reached, all force from the gas spring is internally retained and the piston may be fully unthreaded from the valve stem 30 allowing removal of the actuator assembly from the bonnet 34 of the valve. The actuator 10 may be reinstalled on the bonnet 34 in the reverse procedure without changing the gas spring setting or charge.

The window or slot 54 in the side of the actuator housing 12 reveals the position of the first gas spring body member 14 with respect to the housing 12 which indicates the relative position of the valve being operated. Position indicating microswitches 56 may be positioned with their actuating arms extending in the window or slot 54 such that as the first gas spring body member 14 moves in the housing 12, it successively contacts the microswitch arms and gives a remote position indication of the valve.

In an alternate embodiment shown on FIG. 4, the inner wall of the first gas spring body member 14 has been removed. Seal 22A extends from the inner end of second gas spring body member 18 to the surface of piston rod 28. Seal 22B seals the first gas spring body member 14 to the second gas spring body member 18. Also, seals 78 and 80 seal the other end of first gas spring body member to the piston rod 28. This design simplifies the construction of the gas spring.

In addition, the adjustment of downstop nut 64 in FIG. 1 must be done before assembly of the novel gas spring. The modification shown in FIG. 4 allows the adjustment to be made after assembly of the device. As can be seen in FIG. 4, the stop nuts 75 and 76 are rotatably mounted on threads 77 on the outer surface of second gas spring body member 18. Stop nuts 75 and 76 are accessible through window 54 in housing 12 and thus can be positioned as desired after assembly to provide the proper piston stroke. The more the stop nuts 75 and 76 are moved to the right in FIG. 4, the less travel distance is available for first gas spring body member 14 and, thus, piston 26. The length of the piston stroke is therefore adjustable after assembly of the gas spring. Two stop nuts 75 and 76 are used to provide a locking mechanism so that they stay in the position in which they are placed.

Thus, there has been disclosed a novel gas spring actuator which has variable and adjustable closing force by varying the pressure in the enclosed chambers forming the gas spring. A pressure gauge may be provided to indicate the force units available since the areas exposed to pressure are constant and the pressure is in a direct relationship with force.

The novel gas spring is approximately 6 inches in diameter and 24 inches in length and, for its size, can produce forces in excess of that available with other types of conventional metal springs with the same overall size and weight.

Further, the first and second gas spring body members cannot be disassembled without first removing all gas pressure from the annular hollow chambers therein. The integral charging device must be removed before the first gas spring body member can be removed from the housing. To do this requires that the gas spring be partially compressed for removal of the integral charging device. The second gas spring body member can then be moved towards the first gas spring body member moving the integral charging device in the window in the wall of the housing. The integral charging device can then be rotated and dropped out of the housing through the window. Once the gas charge is removed, there are no retained forces and since the gas spring is charged after installation, there is no requirement for the compression of mechanical springs or the use of special tools during assembly While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A gas spring valve actuator for moving a valve between open and closed states comprising:
   an actuator housing;
   a hydraulic piston slidable in said housing between first and second positions and having a rod for transferring power and a head for receiving hydraulic pressure;
   said valve being actuatable between open and closed states by the piston rod;
   a rigid gas spring body member in the actuator housing having an annular hollow chamber slidably sealed at one end and being slidably associated with the hydraulic piston and housing, said hollow chamber having a compressible fluid therein; and
   means for pressurizing the actuator housing with a predetermined fluid pressure to actuate the valve from a first state to a second state by moving the piston and said rigid body member from a first to a second position and compressing the fluid in the hollow chamber of the rigid gas spring such that when the fluid pressure is removed, the compressed fluid returns the piston to its first position and the valve to its first state.

2. A gas spring actuator as in claim 1 where said rigid gas spring body member comprises:
   a first gas spring body member positioned under the piston head and sealably and slidably surrounding the hydraulic piston rod; and
   said hollow chamber being formed by the first body member surrounding the hydraulic piston rod for receiving the compressible fluid.

3. An actuator as in claim 2 further including:
   a gas input pressure device in the actuator housing for placing a predetermined gas pressure in the hollow chamber as the compressible fluid to force the piston in the piston head direction; and
   a hydraulic input pressure device in the actuator housing for applying hydraulic fluid to the piston head to force the piston against the gas spring and simultaneously compress the gas in the hollow chamber such that when the hydraulic pressure is removed, the compressed gas moves the piston toward its original position.

4. An actuator as in claim 3 further comprising:
   a second gas spring body member fixedly positioned in the actuator housing with one end thereof sealably and slidably inserted in the hollow chamber formed by the first gas spring body member;
   an annular chamber in the second gas spring body member in gas transfer relationship with the hollow chamber formed by the first gas spring body member; and
   the gas input pressure device in the actuator housing being connected to the annular chamber in the second body member such that gas pressure applied to the gas input device is coupled to the hollow chamber in the first body member to force the gas spring in the direction of the piston head.

5. An actuator as in claim 4 wherein:
   the first and second gas spring body members are cylindrical in shape; and
   the hollow chamber in the first gas spring body member is annular in shape.

6. An actuator as in claim 5 further including:
   a stop mechanism coupled to the actuator housing; and
   a downstroke device coupled to the piston rod for contacting the stop mechanism and limiting the travel of the piston; and
   means associated with the piston rod for adjusting the relative physical positions of the downstroke device and the stop mechanism so as to adjust the travel of the piston for proper stroke.

7. An actuator as in claim 6 wherein the means for adjusting the relative physical positions of the downstroke device and the stop mechanism comprises:
   threads on the piston rod; and
   a rotatable stop nut threadedly mounted on the piston rod threads such that rotation of the stop nut on the threads moves the stop nut position longitudinally on the piston rod with physical respect to the stop mechanism to adjust the travel of the piston for proper stroke.

8. An actuator as in claim 7 further including a longitudinal slot in the actuator housing forming a window for visual indication of the position of the first body member with respect to the housing, thus indicating the position of the valve.

9. An actuator as in claim 8 further including:
   a pressure gauge attached to the input gas pressure valve; and
   the pressure gauge being calibrated in force units to enable the actuator to be checked for available closing force without disassembly of the actuator.

10. An actuator as in claim 9 further including:
    a bonnet housing surrounding the hydraulic piston rod; and
    means for rotatably coupling the actuator housing to the bonnet for enabling the actuator housing to be rotated with respect to the first gas spring body member to enable viewing of the first gas spring body member in the actuator housing slot in any convenient position.

11. An actuator as in claim 10 further comprising at least one device coupled to the first gas spring body member through the actuator slot to generate electrical signals representing the position of the first gas spring body member with respect to the actuator housing.

12. An actuator as in claim 11 wherein the at least one device comprises:
    at least one microswitch adjacent the slot in the housing; and
    an actuating arm extending from the switch into the slot for contact by the first gas spring body member to indicate the position of the first gas spring body member in the actuator housing.

13. An actuator as in claim 12 wherein the piston rod comprises:
    a shaft integrally formed with the piston head; and
    an elongated extension threadedly coupled to the piston shaft such that the shaft may be disengaged from the extension for disassembly of the device.

14. An actuator for opening and closing a valve comprising:

a housing;

a piston in the housing moveable between first and second positions to open and close the valve;

a rigid gas spring body member in the housing on one side of the piston and having an annular hollow chamber slidably sealed at one end and being slidably associated with the piston and housing;

a pressurizable compressible fluid in said hollow chamber; and hydraulic pressure selectably applied to the other side of the piston for compressing the compressible fluid while moving the piston and said rigid gas spring body member from the first to the second position and compressing the fluid in the hollow chamber such that when the hydraulic pressure is removed, the compressed fluid returns the piston and the rigid gas spring body member to the first position.

15. A valve actuator as in claim 14 further comprising:

an actuating arm coupled to the valve; and means coupling the piston to the actuating arm such that the piston movement between the first and second position opens and closes the valve.

16. An actuator as in claim 6 wherein the means for adjusting the relative physical positions of the downstroke device and the stop mechanism comprises:

threads on the outer surface of at least a portion of the second cylindrical body member; and a rotatable stop nut threadedly mounted on the second cylindrical body member threads forming a stop mechanism such that rotation of the threaded stop nut moves the stop nut position longitudinally on the second cylindrical body member with respect to the downstroke device to adjust the travel of the piston for proper stroke.

17. An actuator as in claim 16 wherein the rotatable stop nut is accessible from the slot in the actuator housing such that the stop nut position, and piston travel distance, can be adjusted without disassembling the actuator.

18. An actuator for opening and closing a valve comprising:

an enclosed housing;

a piston in the enclosed housing having an arm;

means coupling the piston arm to the valve to change the valve position when the arm is moved in one direction and to return the valve to its initial position when the arm is moved in the other direction;

means coupling hydraulic fluid pressure to one side of the piston in the housing to force the piston to change the valve position;

a rigid gas spring body member in the housing on the other side of the piston and having an annular hollow chamber slidably sealed at one end and being slidably associated with said piston and housing; and a compressible fluid in said hollow chamber being compressed when the piston changes the valve position such that when the hydraulic fluid pressure is released, the compressed fluid on the other side of the piston provides the required pressure to force the piston to return the valve to its initial position.

19. A method of opening and closing a valve comprising the steps of:

coupling an arm to a piston in an enclosed housing;

coupling the piston arm to the valve to change the valve position when the arm is moved in one direction and to return the valve to its initial position when the arm is moved in the other direction;

forcing the piston to change the valve position with hydraulic fluid pressure applied to one side of the piston;

slidably associating a rigid gas spring body member with the other side of said piston, said body member having an annular hollow chamber slidably sealed at one end; and compressing a fluid in the annular hollow chamber in the gas spring body member on the other side of the piston when the piston changes the valve position such that when the hydraulic fluid pressure is released, the compressed fluid provides the required pressure to force the piston to return the valve to its initial position.

20. A method as in claim 19 further comprising the step of varying the pressure required to return the valve to its initial position by pressurizing the closed chamber to a predetermined pressure prior to forcing the piston in the one of the directions with hydraulic pressure.

21. A gas spring actuator as in claim 3 where said gas input pressure device is coupled to the housing such that the gas spring valve actuator cannot be disassembled without removing said gas input pressure device and such that said gas input pressure device cannot be removed without removing all gas pressure in said gas spring.

* * * * *

UNITED STATES PATENT AND TRADEMARK OFFICE
CERTIFICATE OF CORRECTION

PATENT NO. : 5,140,894
DATED : August 25, 1992
INVENTOR(S) : Snyder, et al

It is certified that error appears in the above-identified patent and that said Letters Patent is hereby corrected as shown below:

Column 5, Line 26, "2-42" should read --2-2--.

Column 10, Line 56, "microswitch" should read --switch--.

Column 11, Line 19, after "the" and before "rigid" insert "said".

Signed and Sealed this

Fourteenth Day of September, 1993

Attest:

BRUCE LEHMAN

Attesting Officer

Commissioner of Patents and Trademarks